G. H. CURTISS.
AEROPLANE WING TRUSS.
APPLICATION FILED MAR. 13, 1918.
1,306,750.
Patented June 17, 1919.
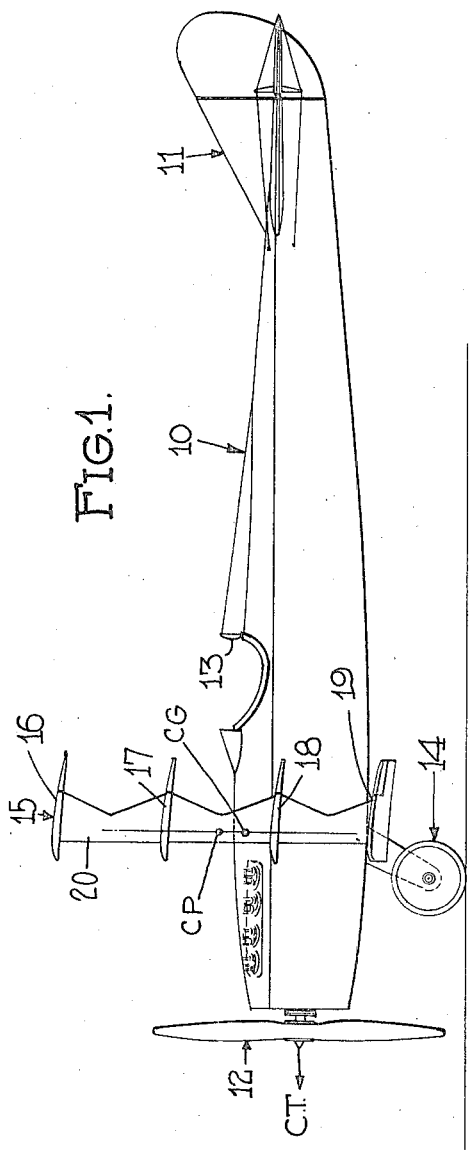
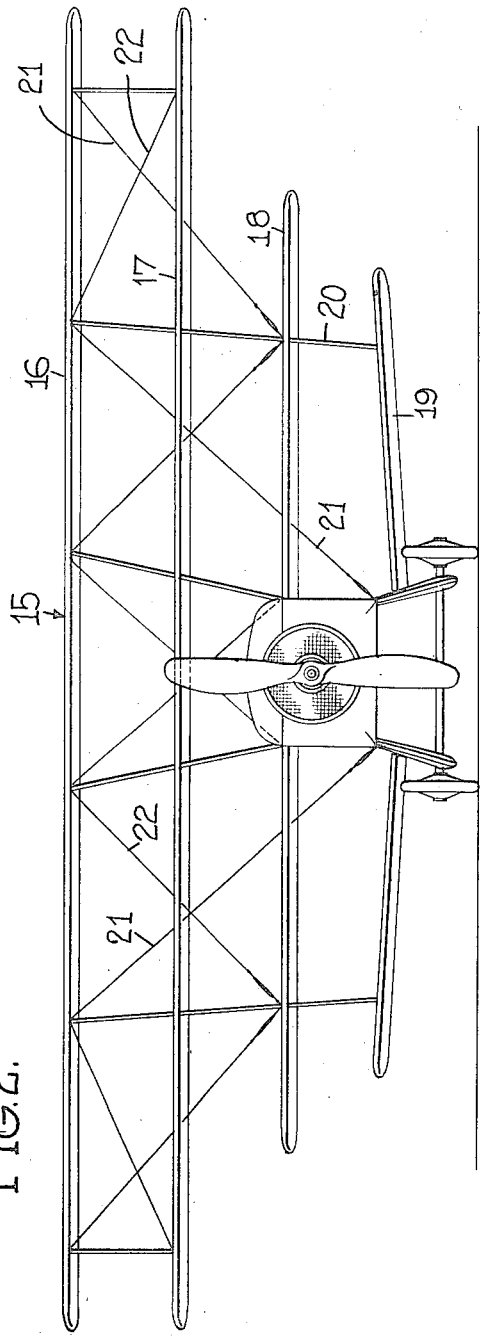
INVENTOR
GLENN H. CURTISS.
by *John P. Jacobs*
ATTORNEY

UNITED STATES PATENT OFFICE.

GLENN H. CURTISS, OF GARDEN CITY, NEW YORK, ASSIGNOR TO CURTISS AEROPLANE AND MOTOR CORPORATION, OF BUFFALO, NEW YORK, A CORPORATION OF NEW YORK.

AEROPLANE-WING TRUSS.

1,306,750.   Specification of Letters Patent.   Patented June 17, 1919.

Application filed March 13, 1918. Serial No. 222,213.

*To all whom it may concern:*

Be it known that I, GLENN H. CURTISS, a citizen of the United States, residing at Garden City, in the county of Nassau and State of New York, have invented certain new and useful Improvements in Aeroplane-Wing Trusses, of which the following is a specification.

My invention relates to aeroplane wing trussing systems and more particularly to trussing systems for quadruplane and multiplane wing structures in which the wings are superposed.

The characteristic of the invention is the re-arrangement of the conventional "Pratt" truss in a manner giving maximum strength with minimum wiring. In a multiplane or quadruplane aircraft the preferred type of wing structure is one in which the lower-most wings have an over-all length or span somewhat less than the over-all span of the wings above. Accordingly the upper-most wings would have an over-all span considerably greater than the span of the lower-most wings, and to a lesser extent, an over-all span greater than the span of the next lower-most wing. For a wing structure thus constructed the improved trussing system is especially designed. It comprises (in a multiplane for example) lift wires extended uninterruptedly from the upper-most wings through two intermediate wings, and drop wires extended uninterruptedly through but one of the intermediate wings. These wires cross brace the wing cells next adjacent the fuselage or body. In the wing cells at the ends of the wing structure the lift and drop wires, although similarly arranged, interconnect respectively the upper-most and next lower-most and next upper-most and upper-most wings. Where the number of superposed wing cells is increased the wiring arrangement is duplicated until the ends of the wings are reached. At the ends the successively decreasing lengths of wiring are to be used. In other words, it is proposed to brace the wings by cross arranged lift and drop wires of unequal and materially different lengths. Maximum strength with minimum wiring and in consequence minimum head resistance is accordingly provided.

Of the drawings:—

Figure 1 is a side elevation of an aeroplane having a quadruplane wing structure, and Fig. 2 is a front end elevation of the aeroplane showing the improved wiring arrangement of the wing structure.

Like numerals of reference designate like or corresponding parts throughout the several views.

In the embodiment of the invention selected for illustration 10 designates the fuselage or body of the craft. It is equipped at its rear end with the conventional tail unit 11 and at its forward end with an appropriate propelling power plant 12. Intermediately a cockpit 13 for the pilot or flying crew is provided and beneath the fuselage nearer the forward end than the rear end a landing gear 14 is located. These units or aeroplane parts form no part of this invention and are shown merely as an illustrative embodiment.

The invention *per se* lies in the improved re-arrangement of the wing structure brace wires. The wing structure is designated as an entirety by the numeral 15. It comprises an upper supporting surface 16, an upper intermediate supporting surface 17, a lower intermediate supporting surface 18 and a lower supporting surface 19. Each surface comprises opposed wings which extend laterally out from the vertical plane of the fore and aft axis of the craft. The upper and upper intermediate supporting surfaces 16 and 17 have an over-all length or span greater than the corresponding span of the lower intermediate and lower supporting surfaces. This is desirable for various reasons, one of which is the clearance above the ground afforded at the wing tips. The fact that the upper supporting surface 16 is 100% efficient while the remaining surfaces are more or less inefficient is of course the principal reason why this type of wing structure is preferred. As shown, the supporting surfaces 18 and 19 are of unequal span and surfaces 16 and 17 of equal span, the span of the latter exceeding that of the former by several feet. The span of the supporting surfaces 18 and 19 however may be the same.

K-struts 20 interconnect the superposed supporting surfaces at intermediate stations throughout the length of the wing structure. These struts may or may not be of the type disclosed. They are however for increased strength, vertically or substantially vertically alined accordingly as their particular location warrants.

The wiring for the wing structure comprises lift wires 21 and drop wires 22. These wires in each instance are cross arranged although of unequal and materially different lengths. The lift wires 21 for bracing the superposed wing cells next adjacent the fuselage or body 10 extend upwardly and outwardly from a point at or near the inner ends of the wings constituting the lower supporting surface 19 to points at or near the connections between the wings of the upper supporting surface 16 and the wing posts or K-struts 20 next removed laterally from the vertical plane of the body. These wires penetrate the two intermediate surfaces 17 and 18 and accordingly adapt the conventional biplane wiring to a quadruplane. The drop wires 22 for the corresponding wing cells are considerably shorter and penetrate but one of the intermediately located supporting surfaces, i. e. the upper intermediate supporting surface 17. These wires, unlike the lift wires, extend downwardly and outwardly from the points of connection of the upper supporting surface 16 with the center wing posts to the points of connection of the lower intermediate supporting surface 18 with the wing posts next laterally removed from the body. At the wing tips and especially at the ends of the two upper-most supporting surfaces which overhang the two lower-most supporting surfaces a similar arrangement of wiring is provided. The lift and drop wires used in this connection are however somewhat shorter than the corresponding wires used for the bracing of the wing cells next inwardly removed. The lift wires 21 for bracing the overhangs extend through the upper intermediate surface 17 for connection at their ends with the upper supporting surface 16 adjacent its point of connection with the outer strut and the lower intermediate supporting surface 18 adjacent its point of connection with the struts next laterally removed from the body. The drop wires 22 although cross arranged, with respect to the lift wires, do not penetrate the supporting surface 17 but directly interconnect the upper supporting surface 16 and the upper intermediate surface 17. These wires are fastened at the points where the surfaces 16 and 17 are fastened to the aforementioned struts.

Where an increased number of wing cells are provided the wiring may be duplicated for a number of the wing cells. It is to be however of substantially the character shown at or near the wing tips. The brace wires, except where the wiring is duplicated, are connected at corresponding ends, even though they brace the same wing cells, with different wings or supporting surfaces. It is this peculiar arrangement of wiring which I rely upon for maximum strength, minimum resistance and minimum length of exposed wire. For a multiplane or for a wing structure having a number of superposed surfaces exceeding four the wiring arrangement may be exactly similar except that the wires would penetrate an increased number of supporting surfaces and would more gradually decrease in length at the ends of the wings.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

I claim—

1. In an airplane, the combination with the fuselage and landing gear, of a wing truss including superposed wings arranged respectively above and below the plane of the fuselage, the lowermost wings being attached to the landing gear, wing posts, and lift and drop wires cross arranged, the lift wires at one end being fastened to the fuselage adjacent the points of attachment of the landing gear rather than at the points of attachment of the adjacent wings.

2. An airplane wing truss including cross arranged lift and drop wires, the outer ends of the outermost cross arranged wires being fastened to wings in closer proximity to each other than the wings to which the inner ends of said wires are fastened and the outer ends of the cross arranged wires next inwardly removed from the outermost being fastened to the same wings as the inner ends of the outermost wires are fastened, said last mentioned cross arranged wires being fastened at their inner ends at points even more distantly removed from each other than the distance between the wings to which the outer ends of said wires are fastened.

In testimony whereof I hereunto affix my signature.

GLENN H. CURTISS.